United States Patent
Sundermeyer et al.

(10) Patent No.: US 11,407,650 B2
(45) Date of Patent: Aug. 9, 2022

(54) METHOD FOR THE REDUCTION OF METAL HALIDES

(71) Applicant: Umicore AG & Co. KG, Hanau-Wolfgang (DE)

(72) Inventors: Joerg Sundermeyer, Marburg (DE); Lisa Hamel, Weimar (DE); Ruben Ramon Mueller, Nidderau (DE); Andreas Rivas-Nass, Bensheim (DE); Angelino Doppiu, Seligenstadt (DE); Eileen Woerner, Nidderau (DE); Ralf Karch, Kleinostheim (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 37 days.

(21) Appl. No.: 16/477,264

(22) PCT Filed: Jan. 24, 2018

(86) PCT No.: PCT/EP2018/051732
§ 371 (c)(1),
(2) Date: Jul. 11, 2019

(87) PCT Pub. No.: WO2018/138150
PCT Pub. Date: Aug. 2, 2018

(65) Prior Publication Data
US 2020/0031684 A1    Jan. 30, 2020

(30) Foreign Application Priority Data

Jan. 25, 2017  (DE) .................... 102017101433.0
Jul. 14, 2017  (EP) ..................... 17181487
Aug. 7, 2017  (EP) ..................... 17185151

(51) Int. Cl.
   *C01G 41/04*       (2006.01)
(52) U.S. Cl.
   CPC .................. *C01G 41/04* (2013.01)
(58) Field of Classification Search
   CPC ..................................... C01G 41/04
   See application file for complete search history.

(56) References Cited

U.S. PATENT DOCUMENTS

| | | | |
|---|---|---|---|
| 2016/0233220 A1* | 8/2016 | Danek ............... | H01L 21/76876 |
| 2016/0305020 A1* | 10/2016 | Wu .................. | B01D 3/346 |
| 2019/0233301 A1* | 8/2019 | Takahashi .......... | C01G 23/022 |
| 2019/0330076 A1* | 10/2019 | Liu ................. | C01G 41/04 |

FOREIGN PATENT DOCUMENTS

CN      105097446 A    11/2015

OTHER PUBLICATIONS

Traven et al., "Reaction of Polysilanes and Their Group IVB Analogs with Tungsten Hexachloride and Molybdenum Pentachloride", translated from Izvestiya Akademii Nauk SSSR, Seriya Khimischeskaya, No. 7, p. 1681, Jul. 1975, 1 page. (Year: 1975).*
Müller, R., et al., "New Tantalum Ligand-Free Catalyst System for Highly Selective Trimerization of Ethylene Affording 1-Hexene: New Evidence of a Metallacycle Mechanism" J. Am. Chem. Soc., 2009, vol. 131, pp. 5370-5371.
Persson, C., et al., "Reduction of tungsten (VI) and molybdenum (V) by allyltrimethylsilane and cyclopentene. Simple high yield syntheses of $MoCl_4(OEt_2)_2$, $MoCl_4(dme)$, $WCl_4(thf)_2$, $WCl_4(dme)$ and $WOCl_3(thf)_2$," Inorganica Chimica Acta, 1993, vol. 203 pp. 235-238.
Tsurugi, H., et al., "Carbon Radical Generation by $d^0$ Tantalum Complexes with a~Diimine Ligands through Ligand-Centered Redox Processes", J. Am. Chem. Soc., 2011, vol. 133, pp. 18673-18683.
Tsurugi, H., et al., "Salt-Free Reducing Reagent of Bis(trimethylsilyl)cyclohexadiene Mediates Multielectron Reduction of Chloride Complexes of W(VI) and W(IV)" J. Am. Chem. Soc., 2013, vol. 135, pp. 5986-5989.
International Search Report for PCT/EP2018/051732 dated Mar. 14, 2018.
Tsurugi, H., et al., Salt-Free Reducing Reagent of Bis(trimethylsilyl)cyclohexadiene Mediates Multielectron Reduction of Chloride Complexes of W(VI) and W(IV), Journal of the American Chemical Society, vol. 135, No. 16, (2013), pp. 5986-5989.
Written Opinion of the International Searching Authority for PCT/EP2018/051732 dated Mar. 14, 2018.
Takahashi et al., "Hydrosilanes as Reducing Reagents of Copper Salts into Copper Metal Particles Remarkably Mild Conditionsunder", Bulletin of the Chemical Society of Japan, vol. 81, No. 1, 2008, pp. 168-170.

* cited by examiner

*Primary Examiner* — Ngoc-Yen Nguyen
(74) *Attorney, Agent, or Firm* — Faegre Drinker Biddle & Reath LLP

(57) ABSTRACT

The invention relates to a method for producing a compound of formula $MX_n$ from a precursor compound of formula $MX_m$, where M is a metal, X is a halide selected from F, Cl, Br, J, m is a number selected from the range 2 to 8, and n is a number selected from the range 1 to 7, with the condition that n<m, comprising a method step in which the precursor compound is reduced with a silane compound to the compound of formula $MX_n$.

10 Claims, No Drawings

METHOD FOR THE REDUCTION OF METAL HALIDES

CROSS-REFERENCE TO RELATED APPLICATIONS

This application is a national stage application (under 35 U.S.C. § 371) of PCT/EP2018/051732, filed Jan. 24, 2018, which claims benefit of European Application Nos. 17181487.4, filed Jul. 14, 2017, 17185151.2, filed Aug. 7, 2017 and German Application 102017101433.0, filed Jan. 25, 2017, all of which are incorporated herein by reference in their entirety.

The invention relates to a method for producing a metal halide from a precursor compound that is likewise a metal halide, comprising a method step in which the precursor compound is reduced with a silane compound.

PRIOR ART

In inorganic and organometallic chemistry, there is a continuous need for metal halides of varying oxidation numbers. In general, it is thereby difficult to provide a metal halide at a concrete oxidation number if analogous metal halides of both higher and lower oxidation number exist. This is especially problematic if the analogous metal halides are relatively stable. The preparatory difficulties, then, consist in that, on the one hand, an effective reduction to a metal halide of lower oxidation number must occur, but, on the other hand, the unwanted consequent reaction to form the metal halide with even lower oxidation number, or even to the elementary metal, must be prevented. Such reactions are therefore only successful if a selective reducing agent is provided. A careful adjustment and monitoring of the process conditions is also often necessary. In general, for this reason, it is often difficult to produce such a metal halide in high yield and purity.

An additional problem is that many metal halides at higher oxidation numbers have a low stability. For example, such reducing reactions may not be implemented at a necessary high reaction temperature if the product or the educt is thermally unstable.

An additional difficulty is that the separation of various metal halides of the same metal is often not simple. Therefore, with such reactions, a high final yield of a purified product is often not obtained, although the yield of the actual reduction is relatively high. Such reactions are, then, only suitable for large-scale production when methods are also available for purification of the metal halides obtained via reduction.

Overall, due to unwanted consequent reactions, stability problems, and purification problems, it is difficult to produce a desired metal halide at high yield via such targeted reduction reactions.

One example of a compound that may be produced via such a targeted reduction is tungsten pentachloride ($WCl_5$, tungsten(V) chloride). This sublimable solid has a low stability and decomposes rapidly in the presence of water, for example. According to the prior art, the production typically takes place via reduction of tungsten hexachloride ($WCl_6$, tungsten(VI) chloride). Various reducing agents have thereby been proposed for preventing unwanted consequent reactions from forming low-number tungsten halides. Thus, in the prior art, various methods have been described for the reduction of tungsten hexachloride, which methods use hydrogen, red phosphorus, aluminum, magnesium, or tin chloride as a reducing agent. These methods are generally in need of improvement, because tungsten pentachloride is not obtained in a high yield, and the extraction from the reaction mixture is thereby also problematic. It is also disadvantageous that such reactions are generally performed at high temperatures, which reduces the yield and product quality. An additional disadvantage is that many of these methods introduce an additional metal into the reaction formulation, which entails additional problems for the purification. The methods are therefore unsuitable for preparatory applications on an industrial scale.

Moreover, in the prior art it has been proposed that tungsten hexachloride be reduced with chlorinated olefins. McCann et al. (Inorganic Synthesis, XIII, 1972, Publisher: F. A. Cotton, McGraw-Hill, Inc.) describe a selective reaction with tetrachloroethylene. The reaction is performed at 100° C. within 24 hours. The yield is to be >90%. The method is relatively energy-intensive, since, in addition to the relatively high reaction temperature, a strong light irradiation is also required. The precise adjustment of the reaction conditions with regard to reaction duration and light intensity is thereby required in order to prevent the formation of by-products. The reaction is therefore still in need of improvement and is only slightly suitable for large-scale applications.

An additional method for reduction of tungsten hexachloride with olefins was described in three publications by Thorn-Csanyi et al. (Journal of Molecular Catalysis, No. 65, 1991, pp. 261 to 267; No. 36, 1986, pp. 31 to 38; and No. 28, 1985, pp. 37 to 48). Non-substituted olefins such as 2-pentene are used as reducing agents. Thorn-Csanyi, 1991, describes a reaction between tungsten hexachloride and olefins that is said to run quantitatively, according to the authors. However, the product, tungsten pentachloride, was not isolated; rather, only the formation in the crude reaction formulation was determined via UV-VIS spectroscopy. A purification from the crude reaction mixture after the reduction is not described in Thom-Csanyi. Therefore, it is unclear whether the separation of various thermally unstable tungsten halides would be possible at all without significant yield losses. Overall, it is thus not disclosed how pure tungsten pentachloride is actually to be produced.

An additional disadvantage of the method of Thorn-Csanyi is that the olefins used as reaction agents have a relatively high reactivity. Therefore, the desired product, tungsten pentachloride, is over-reduced in consecutive reactions. In Thorn-Csanyi, 1986, it is thus described that, after approximately 30 min, tungsten pentachloride was obtained, which, with increasing reaction duration, was decomposed again. Such consecutive reactions are disadvantageous, because they reduce the yield of the desired product. The reaction course must, additionally, be precisely adjusted and monitored, so that the reaction may be terminated at a defined point in time.

An additional disadvantage of the method from Thorn-Csanyi is that the olefins used as reducing agents, such as 2-pentene, are not available in large quantities and in pure form without additional measures. Such olefins are generally obtained from fossil sources via fractionation. Therefore, they include relatively high proportions of very similar, undefined contaminants. High-purity isomers of pentene, such as cis- or trans-pentene isomers, are therefore not available without additional measures, are very expensive, and, for these reasons, are less suitable for use in large-scale processes.

An additional disadvantage of the method from Thorn-Csanyi is that the olefin, as a radical scavenger, reacts in the presence of chlorine radical generators such as $WCl_6$ to produce radical intermediate products that tend to form adhesive olefin dimers and olefin oligomers adhering to the product. Therefore, without further measures, it is not possible to obtain the product at high purity.

Pentenes are also not easy to handle, since they have relatively low boiling points in the range of 20° C. to 40° C. and therefore are relatively volatile. For these reasons, the methods of Thorn-Csanyi are in need of improvement, and, in particular, are only poorly suited to industrial applications.

Object of the Invention

The invention is based upon the object of providing processes that overcome the above-described disadvantages. A simple and efficient method for the production of metal halides should thereby be provided in which the product is obtained at a high yield. The method should be practicable using easily accessible starting materials, should be as energy-efficient as possible, and should thereby, in particular, be feasible at low temperature. It should thereby also be possible to simply extract the product from the reaction batch. Additives that contaminate the product and are difficult to separate should be avoided. The method should also be feasible on an industrial scale. The method should, in particular, be suitable for the production of tungsten pentachloride.

DISCLOSURE OF THE INVENTION

Surprisingly, the object upon which the invention is based is achieved by a process according to the claims.

The subject matter of the invention is a method for the production of a compound of formula $MX_n$ from a precursor compound of formula $MX_m$, wherein M is a metal X is a halide, selected from F, Cl, Br, I, m is selected from a number from 2 to 8, and n is selected from a number from 1 to 7, with the proviso that n<m, including a method step in which the precursor compound is reduced with a silane compound to form a compound of formula $MX_n$.

The method according to the invention serves for the production of a metal halide from a precursor compound that is an analogous metal halide of higher oxidation number. The conversion takes place via a reduction reaction, which is also referred to in the following simply as "the reaction." Surprisingly, it has been found that a metal halide of formula $MX_m$ may be specifically reduced with silane compounds—in particular with organosilanes—as a reducing agent to a lower-number metal halide of formula $MX_n$, without a significant additional reduction (over-reduction) taking place in which the product $MX_n$ would be further reduced, for example, to a metal halide having even lower oxidation number, or to the metal itself.

The educt is described by the formula $MX_m$, and the product is described by the formula $MX_n$. Within the scope of this application, these formulas generally stand for compounds in which the molar ratio of metal to halogen is 1:m or 1:n. The formulas are therefore not to be understood as restrictive, such that a concrete molecule $MX_n$ or $MX_m$ is present. Rather, the compounds may also be dimers, oligomers, or polymers of the specified stoichiometry. For many metal halides, it is also not unambiguous whether the compound is present as, for example, monomers, dimers, or oligomers, under defined conditions. The formula $MX_n$ thus also designates compounds of the formula $(MX_n)_a$, with a=2, 3, 4, 5 or up to ∞. For example, the compounds of formulas $MX_m$ and $MX_n$ may thus be defined molecules, polymers such as linear or cross-linked polymers, or salts with a crystalline structure.

The numerical values, m and n, indicate the number of halogen atoms per metal atom. In the case of halogen compounds, they are always selected as whole numbers. The value, m or n, thereby simultaneously indicates the oxidation number of the metal in the compound.

In the selection of m and n, attention is to be paid that n<m, so that a reduction is designated. The reduction may thereby, in particular, lead to a reduction in the oxidation number of the precursor compound by a value of 1 to 6. This means that m−n=1 to 6. A reaction is preferred in which the oxidation number of the metal is reduced by up to three oxidation numbers, such that m−n=1, 2, or 3. A reaction is preferred in which the oxidation number of the metal is reduced by 1 or 2 oxidation numbers (m−n=1 or 2). In particular, it is preferred that the reduction value of the metal be decreased by precisely 1 (m−n=1).

In a preferred embodiment, m=4, 5, or 6. In a preferred embodiment, n=3, 4, or 5. In a preferred embodiment, m=4, 5, or 6 and n=3, 4, or 5. m=6 and n=5 are particularly preferred. Such higher oxidation numbers are preferred, because the corresponding metal halides $MX_3$, $MX_4$, $MX_6$, or $MX_6$ often have various analogous metal halides, with other valences. Therefore, it is especially advantageous that such compounds according to the invention may be converted via selective reduction into concrete products having a defined lower oxidation number.

In particular, with the method according to the invention, it may be prevented that an additional reaction of the compound $MX_n$ occurs to form a secondary product of lower oxidation number that is smaller than n—for example to form halides of the formula $MX_{n-1}$ or $MX_{n-2}$.

Metals that may form multiple halides of various oxidation numbers are found, in particular, in the subgroups of the periodic table of elements, as well as in the metals of the third through sixth main group. In a preferred embodiment, the metal M is therefore selected from a transition metal, a lanthanide, an actinide, In, Tl, Sn, Pb, Sb, and Bi. The metal is especially preferably a transition metal. It is thereby preferred, in particular, that the compound $MX_m$ have an oxidation number of 3, 4, 5, or 6, in particular of 5 or 6. The metal is particularly preferably such a metal of the subgroup 1, 4, 5, 6, 7, or 8 of the periodic table. The metals of these subgroups are, in particular, known for the fact that they may form various halides with various oxidation numbers. In particular, the metal may be selected from Ti, V, Nb, Ta, Cr, Mo, W, Mn, Tc, Re, Fe, Ru, Os, Cu, and Au. W, Ta, Cu, and Fe are, advantageously, usable. The metal is especially preferably a metal of the sixth subgroup, in particular tungsten. It has been found that the method can be performed particularly efficiently with tungsten halides.

The halide is selected from F, Cl, Br, and I. The compounds $MX_n$ and $MX_m$ thereby preferably have only a single halide. The halide is particularly preferably X=Cl, Br or I, in particular Cl or Br. In a preferred embodiment, X=Cl. Metal chlorides are generally more readily available and easier to handle than other halides, and, for this reason, are more often used as basic materials in organic synthesis and organometallic chemistry.

In a preferred embodiment, the method serves for the production of $WCl_6$ from $WCl_6$. It has been found that this reaction is particularly efficient and selective in the presence of silane compounds.

The method includes a method step in which the precursor compound is reduced with a silane compound to form the desired metal halide. This method step is a reduction in which the silane compound acts as a reducing agent and reduces the precursor compound. This reduction is implemented in a reaction batch that contains the precursor compound, the silane compound, and possibly a solvent.

According to the invention, it is also possible to use mixtures of the individual components, for example two or more different silane compounds. However, it is preferred that the reaction be conducted with a single silane compound and a single precursor compound, since the reaction can then be more easily controlled.

What is designated as a "silane compound" in the context of this application is a compound that has at least one functional group Si—R, wherein R=hydrocarbon, halogen, or hydrogen.

The silane compound is preferably comprised of Si, C, H, and X, wherein X is a halogen as indicated above, preferably Cl.

The silane compound is preferably selected from the group comprising organosilanes, silanes, halosilanes, and organohalosilanes.

According to the usual definition in the field of chemistry, silanes are chemical compounds that consist of a silicon skeletal structure and hydrogen. The silanes may be branched or unbranched. They may be cyclical or linear. Acyclical silanes have the general total formula $Si_yH_{2y+1}$. Cyclic silanes (cyclosilanes) have the total formula $Si_yH_{2y}$. According to the invention, preferred silanes are those with 1 to 10 silicon atoms, in particular 2 to 5 silicon atoms.

In a preferred embodiment, the reducing agent is an organosilane. According to the typical definition, what are designated as organosilanes are compounds that have or consist of silicon and organic groups. The organic groups are preferably hydrocarbon groups. The use of organosilanes as reducing agents has many advantages in the reduction reaction according to the invention. They are generally easily accessible, inexpensive, and available in large quantities and high purity. It has been found that, under mild conditions, they allow a targeted, selective reduction such that an unwanted, additional reduction is prevented. Organosilanes may be used in liquid form and are therefore easy to dose. However, they may also be easily extracted after the reaction, e.g., via distillation, which is advantageous in reactions with thermally unstable metal halides.

In a preferred embodiment, the organosilane is comprised exclusively of silicon atoms and groups R bound thereto, which groups R are hydrocarbons. The hydrocarbons may thereby be selected from alkyl, alkenyl, aryl, or araryl and have 1 to 20 carbon atoms. The hydrocarbons may be saturated or unsaturated. The unsaturated hydrocarbon groups may thereby have a single double bond. In a preferred embodiment, the hydrocarbon groups are saturated. The hydrocarbons are preferably alkyl groups having 1 to 20 carbon atoms, in particular having 1 to 5 carbon atoms.

The hydrocarbons are preferably methyl or ethyl groups, in particular methyl groups. In a preferred embodiment, the organosilane has at least one methyl group that is bound to a silicon atom. The organosilane is particularly preferably comprised of silicon atoms and methyl groups. The organosilane preferably has 1 to 5 silicon atoms, in particular 1 to 3 silicon atoms, and, in particular, two silicon atoms.

The silane compound is preferably liquid at room temperature (25° C.). The silane compound is preferably liquid in the implementation of the method. This has the advantage that it may be used as a solvent or may be mixed with a solvent.

In a further preferred embodiment, the organosilane has at least one Si—H bond. This embodiment is particularly preferred if the organosilane has only one Si atom per molecule. In a preferred embodiment, the organosilane is comprised exclusively of silicon atoms, groups R bound thereto which are hydrocarbons, and S—H groups. A single Si—H bond is thereby preferably present per Si atom, or per molecule.

In a preferred embodiment, the organosilane is an oligosilane. By this are meant organosilanes that have at least one Si—Si bond. The oligosilane preferably has 2, 3, 4, 5, or 6 Si atoms per molecule, for example. It is thereby preferred that, in addition to the two silicon atoms, the disilane have exclusively hydrocarbon groups with 1 to 5 carbon atoms, in particular methyl or ethyl. Oligosilanes are particularly suitable for specifically reducing metals by one oxidation number.

The organosilane is thereby particularly preferably a disilane. According to the invention, it has been found that disilane is especially suited for reducing metals by specifically one oxidation number. Disilanes are, additionally, generally easily accessible, inexpensive, available in large quantities and high purity, usable in liquid form, and easily removable after the reaction. The organosilane is especially preferably a hexamethyldisilane. This compound has the advantage that it is not only liquid at room temperature, but also can be handled easily, is removable, and is readily available. According to the invention, the controlled reduction of metal halides with hexamethyldisilane is particularly efficient and controllable.

In a further embodiment, the silane compound is a halosilane or a organohalosilane. What are referred to as halosilanes are chemical compounds from the group of silanes in which one or more halogen atoms are bound to the silicon atom. Suitable halosilanes may be $Cl_3Si$—$SiCl_3$ or $HSiCl_3$, for example. If the molecule additionally includes an organic group, it is referred to as an organohalosilane. The halosilane or organohalosilane may thereby have at least one, in particular precisely one, Si—H group per Si atom, or per molecule. Organosilanes such as hexamethyldisilane or triethylsilane are advantageous.

In a preferred embodiment, the reduction is performed in a solvent. The solvent is preferably an organic solvent. The solvent particularly preferably contains hydrocarbons or is comprised of hydrocarbons, which may also be halogenated. The hydrocarbons may thereby be aliphatic or aromatic hydrocarbons, or mixtures of these. In a preferred embodiment, the hydrocarbons are aromatic hydrocarbons. Typical solvents, such as substituted benzene, in particular toluene, xylenes, ethyl benzene, or cumene, are suitable as aromatic hydrocarbons. Moreover, annulated arenes such as naphthalene or anthracene are suitable. For example, dichloromethane, chloroform, or also chlorobenzene may be used as halogenated hydrocarbons; of this group of solvents, dichloromethane is advantageously usable.

The solvent is generally selected so that it enables an efficient reaction. It should thereby preferably have a good miscibility with the silane compound and forms a single fluid phase. The precursor compound is dissolved or suspended in the solvent.

Toluene is particularly preferably used as a solvent. It has been found that the reduction of toluene is particularly efficient and proceeds with particularly few secondary reactions.

In a preferred embodiment, the molar substance amount ratio of the precursor compound to the reducing agent is between 2:1 and 1:2, or between 1.5:1 and 1:1.5, or, in particular, between 1.1:1 and 1:1.1, with respect to the ratio of metal atoms to silicon atoms/metal oxidation number difference. The metal oxidation number difference is that between educt and product. In general, the ratio of precursor compound to reducing agent is thus selected so that the transfer of electrons takes place to the required extent. By how many units the oxidation number of the metal is decreased is thereby taken into account. It has thereby been found that a reduction by one oxidation number is particularly efficient if the molar ratio of metal atoms to silicon in the silane compound is approximately 1:1. A reduction by 2 oxidation numbers is particularly efficient if the molar ratio is 1:2. Given a reduction by more than one oxidation number, the proportion of the silicon atoms is increased accordingly. The ideal stoichiometries also result from the reaction equations (I) and (II) above, and corresponding reaction equations for reductions by more than 2 oxidation numbers. A slight shortfall of the reducing agent may thereby possibly be used, in order to prevent a further reduction. Alternatively, depending upon the oxidation potential of the metal halide to be reduced, an excess of the reducing agent may thereby be used, in particular if the educt is not $WCl_6$. For example, excess and shortfall may amount to up to 10 mol % or up to 5 mol % of the ideal ratio.

In a further embodiment, a distinct excess of the reducing agent relative to the precursor compound is used. This embodiment may be advantageous if an overreaction does not occur, or occurs to only an insignificant extent, and thereby, in particular, if the reducing agent is easily available. A particularly fast or complete reduction may then be achieved via a distinct excess of the reducing agent. For example, the molar substance amount ratio of the precursor compound to the reducing agent is thereby greater than 1:10, or greater than 1:20; or between 1:5 and 1:500, or between 1:10 and 1:100, relative to the ratio of metal atoms to silicon atoms/metal oxidation number difference.

The reaction preferably proceeds according to reaction equation (I) or (II):

$$2MX_m + R_3Si\text{—}SiR_3 = 2MX_{m-1} + 2R_3Si\text{—}X \qquad (I)$$

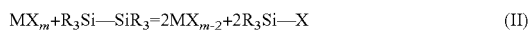

$$MX_m + R_3Si\text{—}SiR_3 = 2MX_{m-2} + 2R_3Si\text{—}X \qquad (II)$$

For reaction equation (I), n=m−1, and, for reaction equation (II), n=m−2.

Even at low temperatures, a high yield may be achieved with the reduction according to the invention. This is very advantageous, since metal halides of the formulas $MX_n$ and $MX_m$, which occur in various oxidation numbers, are often thermally unstable. In particular, it is unnecessary to warm the reaction mixture. In a preferred embodiment, the reduction is carried out at a temperature <60° C., in particular <50° C. or <40° C. In a further preferred embodiment, the reduction is carried out at a temperature of 10° C. to 50° C. The reduction is particularly preferably performed at a temperature of 15° C. to 40° C., in particular between 20° C. and 30° C., or at room temperature (25° C.). The reaction is therefore, in particular, suitable if at least one educt or product decomposes or volatilizes above 100° C., or above 150° C., or above 200° C. In a further preferred embodiment, the temperature may be somewhat increased toward the end of the reaction. This may be advantageous in order to achieve an optimally complete conversion of the metal halide. For example, the reaction may initially be chosen as indicated above and be increased by 10 to 50° C. further on in its course.

The reduction is preferably performed with the exclusion of oxygen, e.g., under an inert gas atmosphere, wherein nitrogen is preferably used as an inert gas. The reduction preferably takes place while stirring.

The reduction may be implemented as a batch process or continuously. The reduction is preferably implemented at normal pressure. The supply of energy, e.g., in the form of light or radiation, is unnecessary.

In a preferred embodiment, the reaction mixture contains only the precursor compound, the silane compound, and possibly the solvent. The addition of auxiliary substances such as catalysts is unnecessary. In particular, it is not necessary to add additional metals or metal compounds such as aluminum, tin, or compounds thereof. Overall, it is thus advantageous that the reaction can be efficiently performed with only a few initial substances and under very mild conditions.

It has been found that the reaction according to the invention generally proceeds relatively quickly. However, the reaction may also be performed over a longer period of time, in order to achieve an optimally complete conversion. This is possible because, according to the invention, the potential consequent reaction to form a lower numbered metal halide or metal does not occur, or occurs only to a limited extent. The reaction with silane compounds as reducing agents may thus also be performed selectively, over longer time periods. This has the advantage that the reaction does not need to be interrupted after a specific time in order to prevent a further reaction. By contrast, the reduction according to known methods, e.g., Thorn-Csanyi, 1986, needs to already be terminated after a short time in order to prevent the further reduction of the desired metal halide, to the extent that it is possible. Therefore, higher yields overall may be achieved with the reaction according to the invention. The implementation is simpler because the reaction does not need to be set up and controlled in a complicated manner in order to achieve an optimum for the reaction yield. For this reason as well, the method according to the invention is simpler and more efficient than known methods.

The method according to the invention is preferably performed over a time period of at least 5 min, at least 10 min, at least 30 min, at least 1 h, at least 2 h, or at least 5 h. The reaction duration may thereby be from 5 min up to 48 h, for example, or from 20 min up to 36 h. What is meant by the time period is the time span from the beginning of the reduction reaction until the reaction is ended. After this time, the metal halide of formula $MX_n$ is preferably obtained in a yield of >90%, preferably >95%. In general, it has been found that the reaction begins relatively quickly after mixing of the educts, such that no particular activation energy needs to be expended. The reaction speed may be limited in the further course of the reaction because the metal halide is of low solubility and therefore is accessible to only a limited extent.

In a preferred embodiment, the method is performed for a relatively short time, e.g., in a time period of 5 min to 60 min, in particular of 10 min to 30 min. Since the reaction according to the invention proceeds very quickly, the production may thereby be accelerated, if desired.

In a preferred embodiment, the method is performed for a relatively long time, e.g., for at least 5 h or at least 10 h, or in a time period of 1 h up to 48 h, or of 5 h up to 36 h. The yield may thereby possibly be improved, in particular if the reaction does not proceed quickly due to the limited solubility of the metal halide.

In a preferred embodiment, the precursor compound is provided, and the silane compound is thereafter added continuously. It is thereby preferred to first dissolve or suspend the precursor compound in solvent. For example, the addition of the silane compound may take place over a time period of 5 min to 5 h, in particular of 10 min to 90 min. In an additional embodiment, the silane compound may also be added once, i.e., not continuously.

It is an advantage of the reduction reaction that it takes place in one step. It is unnecessary to implement additional steps during the reduction, for example to add additional compounds. It is also unnecessary to terminate the reaction after a defined amount of time.

After the end of the reaction, the reaction product is generally present as a precipitated solid. The solvent and/or volatile components are, subsequently, preferably separated out. This may be achieved with typical measures such as filtration, washing and drying. The reaction product is preferably first filtered and washed. Washing may, in the process, be performed with the solvent and/or with other solvents, for example pentane.

The filtrate is, subsequently, preferably dried. A distillation in vacuum is especially suitable in order to avoid temperatures that are too high. A solid is obtained that essentially consists of the desired metal halide.

In a preferred embodiment, the metal halide of formula $MX_n$ that is produced via the reduction is purified via a sublimation. The sublimation is preferably performed directly with the raw product of the reduction reaction from which the solvent has previously been separated. It has been established that an efficient separation of the desired metal halide from secondary products may be achieved via sublimation. In particular, if the compounds contained in the reaction formulation, such as the silane compound, solvent, educts, secondary products, and/or solvent, are volatile, the desired metal halide may be obtained in high-purity form. Sublimation is suitable, in particular, if tungsten pentachloride is produced from tungsten hexachloride.

It is an additional advantage of the method that this may also be performed efficiently and with high yield at a large and industrial scale. In a preferred embodiment, the method is performed with an initial quantity of the precursor compound $MX_m$ that is >5 kg, >10 kg, >15 kg, or >50 kg. For example, the quantity of precursor compound may be between 5 kg and 500 kg—in particular between 10 kg and 100 kg. Surprisingly, it has been found that the reaction may be scaled up in a simple manner, wherein very high yields above 80% or even above 90% may be achieved. This was not expected without taking additional measures, since, in the technical field of industrial chemistry, it is known that scaling up small-scale reactions normally leads to markedly lower yields, or is not possible at all.

In a preferred embodiment, in the method according to the invention, the metal halide of formula $MX_n$ is obtained in a yield of >80%, preferably >85% or >90%, and particularly preferably >93% or >95%, relative to the molar quantity of the precursor compound that is used before the reduction. Such a yield is preferably obtained after the reduction reaction and/or after the sublimation. Such yields are relatively high for partial reductions in which the product may be depleted again via further reduction.

After the first sublimation, the desired metal halide is preferably obtained in a purity of >98 wt. %, in particular >99.5 wt. %, or particularly preferably >99.9 wt. %. The purity may be so high that the proportion of contaminants is <500 ppb, or even <100 ppb (measured via mass spectrometry, with inductively coupled plasma; ICP-MS). Such high-purity products may, in particular, be obtained if volatile components are used in the reaction formulation.

It is an additional advantage of the method that, with a sublimation from the reaction mixture, only a slight sublimation residue remains after the reduction. It was thus found that only approximately 1 to 3% of solid residue remained after the sublimation. This shows that a high-purity product is already achieved in the reduction, and that the separation of the product from the reaction formulation via sublimation is relatively unproblematic. With sublimation, less than 5%, in particular less than 3%, of solid residue preferably remains.

The subject matter of the invention is also a composition that can be obtained according to the method according to the invention. The composition preferably contains the compound of formula $MX_n$ at a purity of >80 wt. %, preferably >90 wt. % or >95 wt. %. In a preferred embodiment, the composition is the solid obtained from the reduction. Solvents and/or volatile components may thereby be separated out as necessary, in particular via filtration, washing, and/or drying.

The composition is an important intermediate product in the production of high-purity metal halides that may, in particular, be separated from the composition via sublimation. However, the composition may also be used directly as a source of the metal halide in a subsequent reaction. High-purity metal halides are used, in particular, for reactions in the gas phase in which the metal or a metal compound is deposited on a substrate. Such a process is, in particular, CVD (chemical vapor deposition), and thereby, in particular, ALD (atomic layer deposition) or MOCVD (metallo-organic chemical gas phase deposition). Since the composition according to the invention contains a high proportion of the desired metal halide, and, moreover, may be obtained without volatile components, it may be used directly as a source of the metal halide for a reaction in the gas phase. The metal halide may thereby be separated from the composition via sublimation and is supplied directly to the reaction in the gas phase.

In a further embodiment, the composition may be the high-purity product obtained via sublimation. This composition may have an extraordinarily high purity, such that—as specified above—the proportions of contaminants may be <100 ppb, for example. Such a composition is also characterized by the absence of detectable contaminants of other metals, because the method may normally be implemented without the addition of further metals or metal compounds. This is advantageous for highly sensitive subsequent processes, such as semiconductor manufacturing, in which the desired metal is deposited from the gas phase, and contaminants are to be absolutely avoided.

The subject matter of the invention is also the use of silane compounds, in particular organosilanes, for the reduction of a compound of formula $MX_n$ from a precursor compound of formula $MX_m$, wherein the compounds $MX_n$ and $MX_m$ are selected as described above.

The methods according to the invention and the uses achieve the object underlying the invention. A simple and efficient method is provided for producing metal halides in high yield. Use of a silane compound as a reducing agent thereby achieves that the reduction of a precursor compound of formula $MX_m$ to a desired metal halide takes place selectively, without a significant subsequent reaction to metal halides of lower oxidation numbers or to metal taking place. This has the great advantage that the reaction may be adjusted and controlled simply, and that a long reaction duration is possible that generally leads to a high product yield. Many silane compounds or organosilanes are, generally, relatively cost-effective and available in large quantities and at high purity, and can, additionally, be handled in a simple manner. In the reaction, silicon halides or silicon halide-alkyl compounds are created that may be treated and disposed of relatively simply. Overall, the method according to the invention is simple and cost-efficient because it may be implemented under mild conditions and requires only a few components. The components may be chosen so that they may be removed simply after the end of the reaction, and thus do not reduce the yield. It is an additional advantage that the method may also be implemented on an industrial scale without further measures, wherein high yields are likewise achieved.

EXEMPLARY EMBODIMENT

Chemicals

The chemicals used in Examples 1 through 3 are compiled in Table 1.

TABLE 1

Chemicals used in Examples 1 through 3

| Compound | Total formula | CAS Nr. | Note | Molar mass g/mol |
|---|---|---|---|---|
| Tungsten hexachloride | $WCl_6$ | 13283-01-7 | 99.9% purity, store in glove box | 396.61 |
| Hexamethyldisilane (HMDSi) | $Si_2C_6H_{18}$ | 1450-14-2 | 99.5% purity (determined via GC), store via molecular sieve 4 Å | 146.38 |
| Toluene | $C_7H_8$ | 108-88-3 | anhydrous, distilled via Na/benzophenone, store via molecular sieve 4 Å and $Al_2O_3$ | 92.14 |
| Pentane | $C_5H_{12}$ | | anhydrous | 72.15 |
| Tungsten pentachloride | $WCl_5$ | 13470-14-9 | Reaction product | 43.67 |

Thermogravimetry (TGA) with simultaneous differential thermoanalysis (SDTA)

Thermogravimetric analyses (TGA), as well as the weigh-ins for them, took place under nitrogen atmosphere in a glove box with a device of make TGA 3+ (Manufacturer: Mettler Toledo; evaluation with software branded as Stare). For the measurement, approximately 6-12 mg of a sample were weighed in an aluminum oxide crucible. The TGA (mass loss) and SDTA (heat flow) curves were obtained as results. The first derivation (DTG curve, speed of the mass variation) was respectively calculated from the TGA curve. The heating rate was 10 K/min or 20 K/min.

Example 1

Tungsten hexachloride was reduced with hexamethyldisilane (HMDSi) to tungsten pentachloride according to the following reaction equation. Chemicals and substance amounts as indicated in Table 2 were thereby used. The reaction time was 24 h.

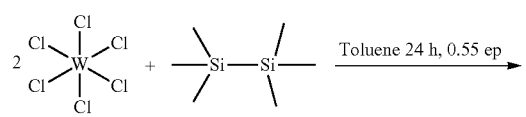

TABLE 2

Chemicals and substance amounts according to Example 1

| Chemicals | Initial quantity (g) | Volumes (mL) | Substance amount (mmol) | Equivalents (eq) |
|---|---|---|---|---|
| $WCl_6$ | 0.907 | — | 2.287 | 1.00 |
| HMDSi | 0.184 | — | 1.258 | 0.55 |
| Toluene | — | 25 | — | — |

In a heated 250 mL Schlenk flask placed under nitrogen, $WCl_6$ was weighed into a glove box. Outside of the glove box, toluene and, then, the hexamethyldisilane were added under $N_2$ flow, and the tube was sealed tightly. It was stirred at room temperature.

The created solid was subsequently filtered under nitrogen through a reversion frit (G4, ca. 10-16 µm pore diameter) and flushed again with dry toluene (2× with 10 mL), and, subsequently, was flushed with dry n-pentane (2× with 10 mL). Then, it was dried for several hours at room temperature and in fine vacuum ($10^{-3}$ mbar). Storage took place in a glove box under nitrogen atmosphere.

Approximately half of the product was weighed into a sublimation apparatus and sublimated for approximately 5 h at 160° C. oil bath temperature in fine vacuum ($10^{-3}$ mbar). Violet crystals formed at the cooling finger.

Example 2

Tungsten hexachloride was reduced with hexamethyldisilane to tungsten pentachloride, as described in Example 1, with the following modifications: The substance amounts according to Table 3 were used. The reaction time was 1 h.

TABLE 3

Chemicals and substance amounts according to Example 2

| Chemicals | Initial quantity (g) | Volumes (mL) | Substance amount (mmol) | Equivalents (eq) |
|---|---|---|---|---|
| $WCl_6$ | 16.089 | — | 40.566 | 1.00 |
| HMDSi | 2.850 | — | 19.472 | 0.48 |
| Toluene | — | 100 | — | — |

Example 3

Tungsten hexachloride was reduced with hexamethyldisilane to tungsten pentachloride, as described in Example 1, with the following modifications: The substance amounts according to Table 4 were used. The reaction time was 20 h.

TABLE 4

Chemicals and substance amounts according to Example 3

| Chemicals | Initial quantity (g) | Volumes (mL) | Substance amount (mmol) | Equivalents (eq) |
|---|---|---|---|---|
| $WCl_6$ | 13.917 | — | 35.094 | 1.00 |
| HMDSi | 2.465 | — | 16.845 | 0.48 |
| Toluene | — | 100 | — | — |

Results:

The yields of tungsten pentachloride before and after sublimation are compiled in Table 5.

TABLE 5

Overview of the yields of tungsten pentachloride

| Example | Conditions | Total yield of raw product after precipitation (%) | Sublimate yield (%) | Sublimation residue (%) |
|---|---|---|---|---|
| 1 | 0.55 eq, 24 h | 77.7 | —* | —* |
| 2 | 0.48 eq, 1 h | 87.3 | 92.1 | 2.7 |
| 3 | 0.48 eq, 20 h | 89.4 | 93.8 | 1.4 |

*Reaction on a small scale; therefore, no sublimation was initially performed.

The missing percentages from the addition of "sublimate yield" and "residue" are possibly solvent residues that were not removed upon drying the raw product, and losses in the scraping of the sublimate from the sublimation tube.

The results show that, with hexamethyldisilane as a reducing agent, the desired product may already be obtained at high yield and purity after a relatively short time (1 h). A nearly residue-free, sublimable raw product may be obtained after approximately 20 h. An over-reduction almost never occurs with use of stoichiometrically equivalent quantities (or a slight shortfall), with respect to the ratio of metal to Si.

Product that has once sublimated sublimates completely in a second sublimation under vacuum, which means that no decomposition occurs under vacuum at high temperatures (up to at least 160° C.). With measurements of the thermal decomposition under normal pressure (nitrogen atmosphere, TGA measurement), a decomposition may be detected at different heating rates (="residence times"). This is apparent from the mass loss in the TGA measurement. An increase in the heating rate in the TGA measurement promotes the complete mass loss of the product.

Example 4: Implementation on a Large Scale

Tungsten hexachloride was reduced with hexamethyldisilane to tungsten pentachloride. Chemicals according to Table 1 were thereby used, wherein HMDSi and solvent, obtained in high-purity form as from the manufacturer, were used. 66 L toluene are placed in a 100 L reactor rendered inert with nitrogen. 19.0 kg (47.86 mol, 2.03 eq.) tungsten hexachloride are added while stirring at 100 R/min and subsequently washed with 10 L toluene. The flow temperature is set to 30° C. 3.47 kg (23.56 mol, 1 eq) hexamethyldisilane are dosed in within 1 h and subsequently washed with 5 L toluene. Subsequent stirring takes place for 1 hour at 100 R/min and a flow temperature of 20° C.

The reaction mixture is filtered, and the filter cake is displacement washed with 10 L toluene. The filter cake is subsequently washed three times—each time with 10 L pentane. The product is dried in a vacuum at 40° C. The yield was 16.2 kg (94%, relative to $WCl_6$).

The result shows that the reaction can be scaled up without significant loss of yield and product quality, wherein chemicals that are typically readily available may be used. These advantages are highly significant in industrial production.

Example 5: Reduction of $FeBr_3$ and $CuBr_2$ $FeBr_3$ and $CuBr_2$ were reduced with HMDSi (hexamethyldisilane, $(CH3)_6Si_2$) to the respective next lowest stable oxidation number.

General Experimental Procedure 0.2 g $FeBr_3$ were weighed into a heated Schlenk flask under inert gas atmosphere. 3 mL HMDSi were added under nitrogen flow. It was briefly heated to boiling and was subsequently stirred for 8 hours at 70° C.

Although, with $CuBr_2$, the process proceeds analogously, deviating from the method with $FeBr_3$, it was filled up under air and subsequently evacuated, and was not warmed.

With iron bromide, a discoloration of the yellow-brown fluid occurred after the warming. After warming to 70° C. for eight hours, solution and solid have a yellow color. With copper bromide, a discoloration already took place after a few minutes at room temperature, such that a warming was omitted.

The created solids were then filtered at room temperature through a G4 filter frit under nitrogen atmosphere. Drying subsequently took place in fine vacuum ($10^{-3}$ mbar) at room temperature for several hours, and the samples were kept under inert gas.

Using micro-X-ray fluorescence spectroscopy (μRFA, Bruker Tornado M4 with rhodium and tungsten x-ray tubes, two silicon drift detectors), it was established that $FeBr_2$ and CuBr were obtained as reaction products.

Example 6: Reduction of $WCl_5$ and $TaCl_4$ in Dichloromethane as a Solvent The metal halides (MH) were weighed into an inert gas atmosphere (glove box) in Schlenk flasks and filled outside the glove box with approx. 40 mL dried dichlormethane. The calculated amount of silane was added in a stream of nitrogen while stirring. The input weight (EW) and yields (AW) per test are documented in Table 6.

The processing took place at room temperature after 24 h of stirring, by filtration under inert gas using a G4 frit. The precipitate was washed with dry hexane and dried under vacuum ($10^{-3}$ mbar) at room temperature. The products were stored in the glove box until further use.

TABLE 6

Input and output weights of the tests in methylene chloride

| No. | Reaction | Equivalents (silane) | Silane | EW MH g (mmol) | EW silane g (mmol) | AW product g | AW % |
|---|---|---|---|---|---|---|---|
| 1 | $WCl_6 \rightarrow WCl_5$ | 0.48 | HMDSi | 0.952 (2.40) | 0 169 (1.15) | 0.659 | 76.0 |
| 2 | $WCl_6 \rightarrow WCl_5$ | 0.48 | TESi | 0.870 (2.19) | 0.122 (1.05) | 0.299 | 37.8 |
| 3 | $WCl_6 \rightarrow WCl_5$ | 1 | TESi | 0.990 (2.50) | 0.290 (2.50) | 0.630 | 69.8 |
| 4 | $WCl_6 \rightarrow WCl_5$ | 1 | DMCSi | 0.995 (2.51) | 0.240 (2.53) | 0.754 | 83 2 |
| 5 | $TaCl_5 \rightarrow TaCl_4$ | 0.48 | TESi | 0.917 (2.56) | 0.143 (1.23) | 0.563 | 68.2 |

Annotations:
EW—input weight,
AW—output weight,
MH—metal halide,
HMDSi—hexamethyldisilane,
TESi—triethylsilane ($Et_3SiH$),
DMCSi—dimethylchlorosilane ($Me_2SiHCl$)

Observations:

Test 1: In the filtration, a portion of the product passed through the frit, such that the output weight initially appeared to be lower; after separation of this precipitate, the total yield of >90% was determined.

Test 2: Gas development, reaction slow.

Test 4: Reaction slow, concluded only after 24 h.

The identification of the reaction products was performed via x-ray diffractometry of the powders obtained as a product, and confirmed that $WCl_5$ or $TaCl_4$ were obtained as reaction products.

The invention claimed is:

1. A method for production of a compound of formula $MX_n$ comprising providing a precursor compound of formula $MX_m$, wherein
   M is tungsten,
   X is a halide, selected from F, Cl, Br, I,
   m is 6, and
   n is 5,
   reducing the precursor compound with a silane compound to form a compound of formula $MX_n$, and
   optionally, purifying the $MX_n$ compound via sublimation after the reducing step,
   wherein at least 10 kg of the precursor compound of formula $MX_m$ are used,
   wherein, after the reduction and/or after the sublimation, the metal halide of formula $MX_n$ is obtained in a yield of >90% relative to the molar quantity of precursor compound that was used, and
   wherein the reducing step is performed for a time period of 5 min to 60 min.

2. The method according to claim 1, wherein X=Cl.

3. The method according to claim 1, for the production of $WCl_5$ from $WCl_6$.

4. The method according to claim 1, wherein the silane compound selected from the group consisting of organosilanes, silanes, halosilanes, and organohalosilanes.

5. The method according to claim 1, wherein the silane compound is an organosilane that has at least one methyl group that is bound to a silicon atom.

6. The method according to claim 1, wherein the silane compound is an oligosilane or a disilane.

7. The method according to claim 1, wherein the reduction is performed in a solvent that has aromatic hydrocarbons.

8. The method according to claim 1, wherein the molar substance amount ratio of the precursor compound to the reducing agent is between 2:1 and 1:2 and/or
   wherein the reduction is performed at a temperature of 10° C. to 50° C.

9. The method according to claim 1, wherein the metal halide of formula $MX_n$ is purified via sublimation after the reduction.

10. The method according to claim 9, wherein the metal halide of formula $MX_n$ has a purity of greater than 99.9 wt. %.

* * * * *